United States Patent [19]
Beatty et al.

[11] 3,982,966
[45] Sept. 28, 1976

[54] ALKALINE CELL WITH DOUBLE COLLECTOR POSITIVE, NEGATIVE AND THIRD TERMINAL CONNECTIONS

[75] Inventors: Theodore R. Beatty, Bay Village; Harry Vourlis, Lakewood, both of Ohio

[73] Assignee: Union Carbide Corporation, New York, N.Y.

[22] Filed: Mar. 17, 1975

[21] Appl. No.: 559,076

Related U.S. Application Data
[63] Continuation-in-part of Ser. No. 456,838, April 1, 1974, Pat. No. 3,871,921.

[52] U.S. Cl. ................................. 429/136; 429/206
[51] Int. Cl.² ........................................... H01M 6/06
[58] Field of Search ........... 136/111, 135, 175, 176, 136/6 A, 6 C, 6 G

[56] References Cited
UNITED STATES PATENTS
| | | | |
|---|---|---|---|
| 3,554,805 | 1/1971 | Weinstock | 136/6 G |
| 3,871,921 | 3/1975 | Beatty et al | 136/111 |

Primary Examiner—John H. Mack
Assistant Examiner—C. F. Lefevour
Attorney, Agent, or Firm—Eugene Lieberstein

[57] ABSTRACT

An alkaline cell is described wherein at least a pair of flat electrode elements of opposite polarity having a porous separator containing the alkaline electrolyte interposed therebetween are arranged in the form of a conventional electrode stack assembly, and wherein the electrode assembly is enclosed within a sealed, liquid-impervious plastic film envelope having a positive, negative and a third terminal connection in the walls thereof, each terminal connection comprising flat internal and external current collectors disposed adjacent to the inner and outer sides respectively of the walls overlying openings therein, the collectors being tightly adhered to the respective sides of the walls by thin layers of an adhesive sealant which is non-wettable by the alkaline electrolyte. Means are provided for making electrical connection between the current collectors through the openings in the walls of the envelope.

15 Claims, 7 Drawing Figures

ALKALINE CELL WITH DOUBLE COLLECTOR POSITIVE, NEGATIVE AND THIRD TERMINAL CONNECTIONS

RELATED APPLICATIONS

This application is a Continuation-In-Part of our copending U.S. Pat. application Ser. No. 456,838, filed April 1, 1974 now U.S. Pat. No. 3,871,921.

BACKGROUND OF THE INVENTION

This invention relates to alkaline cells in general and more particularly to a flat alkaline cell construction wherein the active elements are enclosed within a sealed, liquid-impervious plastic film envelope and wherein the envelope is provided with both positive and negative terminal connections and a third terminal connection for an auxiliary electrode. In one aspect of the invention, a flat rechargeable cell enclosed within a sealed plastic film envelope and having positive and negative terminal connections is provided with a third terminal connection for an oxygen or hydrogen sensing electrode or a voltage reference electrode.

In our copending application Ser. No. 456,838 entitled "Flat Alkaline Cell Construction And Method For Assembling The Same", filed Apr. 1, 1974, of which this application is a Continuation-In-Part, there is disclosed and claimed a flat alkaline cell wherein at least a pair of flat electrode elements of opposite polarity having a porous separator containing the alkaline electrolyte interposed therebetween are arranged in the form of a conventional electrode stack assembly. This electrode assembly is enclosed within a sealed, liquid-impervious plastic film envelope having a terminal connection provided in one wall thereof adjacent to one end of the electrode assembly. The terminal connection is made using both internal and external current collectors which are disposed adjacent to the inner and outer sides respectively of the wall of the sealed envelope and which overlie an opening in the wall. The internal current collector is disposed adjacent to the end of the electrode assembly and is in electrical connection with one of the electrode elements. A thin layer of an adhesive sealant is interposed between the internal current collector and the inner surface of the wall of the sealed envelope and another thin layer of the adhesive sealant is interposed between the external current collector and the outer surface of the wall. Both layers of adhesive sealant cover substantially the entire face of both current collectors, except for a small area coinciding with the opening in the wall. Suitable means are provided for making electrical connection between the internal and external current collectors through the opening, such as a spot weld.

Alkaline electrolytes are notoriously known for their ability to readily wet most metal and plastic surfaces and to creep past seals conventionally used in current-producing electrochemical cells. Our flat cell construction as described above effectively solves this problem through the use of an adhesive sealant which is non-wettable by the alkaline electrolyte. The thin layers of adhesive sealant used to tightly bond both current collectors to the plastic film envelope actually resist creepage of the electrolyte past the sealing interfaces and out through the opening in the wall of the envelope. Preferably, the adhesive sealant is chosen from the class of compounds known as "fatty polyamides", although other adhesive sealants which are not readily wet by the alkaline electrolyte can also be used.

Still another advantage of our flat cell construction resides in the provision of an extended leakage path over which the electrolyte must travel in order to escape from the cell. This extended leakge path comprises both of the sealing interfaces between the internal and external current collectors and the inner and outer sides of the wall of the sealed envelope or in other words, the leakage path traverses approximately the total width or length of each collector.

In a typical flat cell construction made in accordance with our above referred to copending application, the sealed envelope is advantageously formed by a pair of plastic film wall members arranged such that each wall member overlies an end of the electrode assembly, both plastic film wall members being sealed together along their marginal borders such as by a heat seal. A positive terminal connection is provided in one of the plastic film wall members adjacent one end of the electrode assembly and a negative terminal connection is provided in the other plastic film wall member adjacent to the other end of the electrode assembly. Both positive and negative terminal connections are made in the same manner as described hereinabove using internal and external current collectors tightly adhered to the plastic film wall members by a thin layer of the adhesive sealant. The arrangement of the terminal connections is such that a plurality of the individual flat cells may be stacked together with the positive terminal connection of one cell being in electrical connection with the negative terminal connection of an adjacent cell in the stacked assembly to constitute a series-connected battery. Flat cells with this arrangement of the terminal connections can also be assembled into parallel and series-parallel connected batteries.

It has already been proposed in the prior art to employ so-called "auxiliary electrodes" in current-producing electrochemical cells. These auxiliary electrodes are used in conjunction with the working electrodes, i.e., positive and negative electrodes, to perform certain valuable functions in operation of the cells. Such auxiliary electrodes have been used, for instance, in rechargeable cells to detect or sense the presence of excessive amounts of either oxygen or hydrogen gas that may be generated under certain conditions such as when the cells are overcharged.

In U.S. Pat. No. 3,462,303 to H. Reber, there is disclosed a sealed rechargeable cell wherein an auxiliary electrode is maintained in contact with a gas space and the liquid electrolyte. The auxiliary electrode will form with the negative electrode of the cell a voltage differential the value of which will be dependent on the partial oxygen pressure in the gas space of the sealed cell. When the cell is subjected to overcharging, the partial oxygen pressure in the gas space will rise, a change in the voltage differential will occur and this change is utilized for actuating control devices for terminating the charging current and thereby prohibiting the build-up of an excessive gas pressure inside the cell.

Basically the same auxiliary electrode arrangement may be used in a rechargeable cell such as described above to sense the pressure of hydrogen gas pressure in the cell. In this instance, the auxiliary electrode which will form with the positive electrode of the cell a voltage differential whose value will be dependent on the partial hydrogen pressure in the gas space under conditions where hydrogen gas may be evolved during operation of the cell.

Auxiliary electrodes may also be incorporated in current-producing electrochemical cells as a voltage reference device. It is possible for instance to electrochemically couple the positive or negative electrode of a rechargeable nickel-cadmium cell to an auxiliary reference electrode and study the discharge behavior of either electrode independently of the other. Auxiliary electrodes in these applications are a valuable tool to the researcher since he can carry out his studies without having to dismantle the cell construction.

Provision must of course be made in the sealed assembly of the current-producing electrochemical cell for making external electrical connection with the auxiliary electrode. Such means usually comprises a separate or third terminal connection in the sealed assembly in addition to both the positive and negative terminal connections. Basically the same type of construction is used for the third terminal connection regardless of whether the auxiliary electrode is employed as an oxygen or hydrogen sensing electrode or voltage reference electrode.

The principal object of this invention is the provision of a flat alkaline cell construction of the character described in our above-referred to copending application wherein there is provided both positive and negative terminal connections in the walls of the plastic film envelope and a third terminal connection for an auxiliary electrode.

SUMMARY OF THE INVENTION

This invention resides in a flat alkaline cell construction wherein at least a pair of flat electrode elements of opposite polarity having a porous separator containing the alkaline electrolyte interposed therebetween are arranged in the form of a conventional electrode stack assembly. The electrode assembly is enclosed within a sealed envelope made of a liquid impervious plastic film and preferably a plastic film which is electrically non-conductive. The sealed envelope is formed with first and second wall members, one of which is disposed adjacent to one end of the electrode assembly and the other of which is disposed adjacent to the other end thereof. The first wall member is provided with at least one opening and the second wall member is provided with at least a pair of openings which are spaced apart from one another. First internal and external current collectors are disposed adjacent to the inner and outer sides respectively of the first wall member overlying the opening, the first internal current collector being also disposed adjacent to one end of the electrode assembly and being in electrical connection with one of the pair of electrode elements. Second internal and external current collectors are disposed adjacent to the inner and outer sides respectively of the second wall member overlying one of the pair of openings, the second internal current collector being also disposed adjacent to the other end of the electrode assembly and being in electrical connection with the other of the pair of electrode elements. Third internal and external current collectors are disposed adjacent to the inner and outer sides respectively of the second wall member overlying the other opening, the third internal current collector being also disposed adjacent to the other end of the electrode assembly and being in electrical connection with an auxiliary electrode. A thin layer of adhesive sealant which is non-wettable by the alkaline electrolyte, preferably a fatty polyamide sealant, is interposed between the first internal current collector and the inner surface of the first wall member, and another thin layer of the adhesive sealant is interposed between the first external current collector and the outer surface of the first wall member. Similarly, a thin layer of the same adhesive sealant is interposed between the second and third internal current collectors and the inner surface of the second wall member and another layer of the same adhesive is interposed between the second and third external current collectors and the outer surface of the second wall member. All layers of adhesive sealant preferably cover substantially the entire surface of the internal and external current collectors, except for a small area coinciding with the openings in the first and second wall members. Suitable means such as a spot weld are provided for making electrical connection between the respective pairs of internal and external current collectors through the openings in the first and second wall members.

With the flat cell construction of the invention, the first, second and third terminal connections are tightly sealed against leakage of the alkaline electrolyte from inside the cell. The thin layers of adhesive sealant tightly bond the internal and external current collectors to the first and second wall members and seal the interfaces between the current collectors and both sides of the wall members forming the sealed envelope. There is also provided in accordance with the invention an extended leakage path which traverses approximately the total width or length of each internal and external current collector.

In the assembly of the flat cell construction of the invention, the internal electrical connections between the first and second internal ccollectors and the pair of electrode elements of opposite polarity may be arranged such that the first or second terminal connection constitutes the positive terminal which the other of the first or second terminal connection constitutes the negative terminal of the cell.

In the prefered embodiment of the invention, a flat alkaline cell is constructed using a sealed envelope composed of two parts, a plastic film cupped container in which the electrode assembly is placed and a plastic film cover, both the cupped container and cover being sealed tightly together along their marginal borders such as by a heat seal. Both the cover and the bottom wall of the cupped container are provided with sealed terminal connections, i.e., positive nad negative terminal connections, respectively, and a third terminal connection for the auxiliary electrode is provided in either the cover or container bottom. All of the terminal connections are made using both internal and external current collectors in the same manner as hereinabove described.

In the assembly of a flat cell in accordance with the preferred embodiment of the invention, the cupped container, cover and the collectors are first assembled as composite units. Both the internal and external current collectors for the first, second and third terminal connections are tightly bonded to the inner and outer sides respectively of the container bottom wall and cover using the thin layers of adhesive sealant. The electrode stack assembly is placed inside the so-formed composite cupped container-collector with all appropriate internal electrode connections being made at one end of the electrode assembly. The composite cover-collector is then placed over the open end of the cupped container-collector with all appropriate internal electrode connections being made at the opposite end of the electrode assembly. The sealed envelope is then completed by tightly sealing together the marginal borders of both the composite container-collector and cover-collector such as by a heat seal. The method of assembling the flat cell is more fully disclosed and claimed in our above-referred to copending application.

Although the invention is widely applicable to flat alkaline cells in general, it will be more fully described hereinafter with particular reference to a rechargeable nickel-cadmium cell. It will be understood, of course, that the flat alkaline cell construction of the invention may utilize other electrode systems such as the zinc-/manganese dioxide system as will be readily seen to those skilled in the art.

DESCRIPTION OF THE PREFERRED EMBODIMENTS

Figure 1:
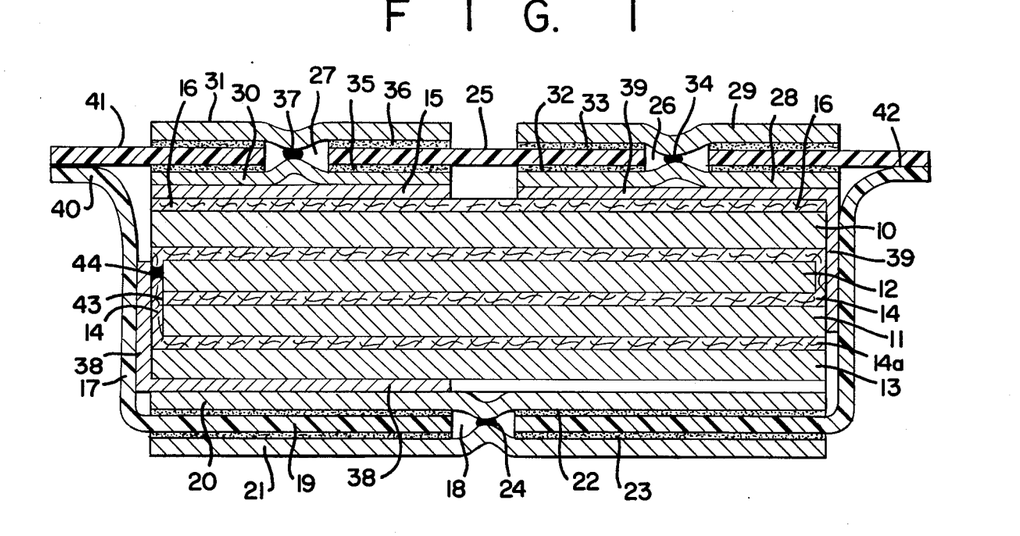
FIG. 1 is an elevational view in cross-section of a flat alkaline cell construction made in accordance with the invention.

FIG. 1 illustrates a rechargeable flat nickel-cadmium cell made in accordance with the invention. The cell comprises a pair of flat thin positive electrode plates 10, 11 and a pair of flat thin negative electrode plates 12, 13 having a porous separator 14 containing the alkaline electrolyte interposed therebetween, the pairs of positive and negative electrode plates 10–13 and separator 14 being arranged in the form of a conventional electrode stack assembly. The pairs of positive and negative electrode plates 10–13 are arranged in alternate fashion with the positive electrode plate 10 being located at one end of the electrode assembly, the negative electrode plate 12 placed between the pair of positive electrode plates 10, 11 and with the negative electrode plate 13 being located at the opposite end of the electrode assembly. The porous separator 14, which is thoroughly soaked with the alkaline electrolyte, is sandwiched between and in contact with the pairs of electrode plates of opposite polarity, that is, between the positive electrode plate 10 and negative electrode plate 12, and between the positive electrode plate 11 and each of the negative electrode plates 12, 13. Preferably, the porous separator 14 is in the form of a continuous strip of the separator material which is wound completely around the negative electrode plate 12 and then interposed between the positive electrode plate 11 and the negative electrode plate 13. All of the electrode plates 10–13 are rectangular in shape and are of substantially the same size such that the electrode plates are congruent with one another in the electrode stack assembly.

The positive electrode plates 10, 11 contain an electrochemically oxidizable active material such as nickel-hydroxide while the negative electrode plates 12, 31 contain an electrochemically reducible active material such as cadmium oxide or cadmium hydroxide. In accordance with the conventional practice in the art, the negative electrode plates 12, 13 contain additional active material in order to provide an overcharge reserve which will prohibit the harmful generation of hydrogen gas on over-charge of the cell. Similarly, the positive electrode plates 10, 11 may contain some negative active material as antipolar mass in order to provide an overdischarge reserve which will substantially delay harmful generation of hydrogen gas on overdischarge of the cell. Both the positive electrode plates 10, 11 and negative electrode plates 12, 13 may be sintered type electrodes fabricated from a sintered metal plaque which may be made, for example, by sintering a layer of metal powder, e.g., nickel powder, onto both sides of an open, porous substrate such as a nickel screen, which serves as a mechanical support. The sintered metal plaque is impregnated with the electrochemically active material in accordance with methods well known in the art. The separator 14 containing alkaline electrolyte, may be made from a conventional separator material such as a nonwoven organic fiber matte. A preferred type is made from nylon fiber under the tradename "Pellon". Suitably, the alkaline electrolyte used in the cell is a 30 percent by weight solution of potassium hydroxide.

An auxiliary electrode 15 is positioned adjacent to the positive electrode plate 10 at one end of the electrode stack assembly. The auxiliary electrode 15 is less than half the size of the positive and negative electrode plates 10–13 and is preferably placed over the top of one-half section of the positive electrode plate 10 (the left hand half-section of the positive electrode plate 10 in FIG. 1). A separate porous separator 16, e.g., Pellon, thoroughly soaked with the alkaline electrolyte, is interposed between and in contact with the positive electrode plate 10 and the auxiliary electrode 15.

the auxiliary electrode 15 is an oxygen sensing electrode. It is preferably positioned adjacent to the positive electrode plate 10 in order to sense more effectively the beginning of oxygen evolution at this electrode during charging of the cell. The oxygen sensing electrode 15 may be composed of nickel, for example, and preferably is made from a sintered nickel plaque as described above.

The electrode assembly including the auxiliary electrode 15 is enclosed within a shallow, rectangular, cupped container 17. This cupped container 17 is preferably made by vacuum forming a rectangular cup from a sheet of liquid impervious, electrically non-conductive plastic film, such as a polypropylene film. The cupped container 17 is formed with an opening 18 in the middle of its bottom wall 19.

Figure 2:
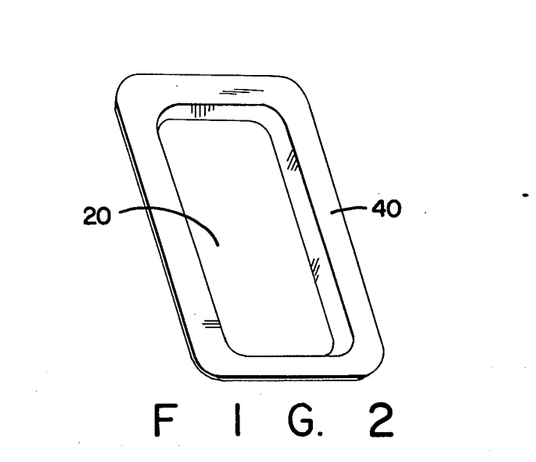
FIG. 2 is a perspective view of the composite cupped container-collector used in the flat cell of FIG. 1.

A first terminal connection is provided in the bottom wall 19 of the cupped container 17. This terminal connection comprises first internal and external current collectors 20, 21 which may be in the form of flat, thin metal plates or foils, suitably a nickel foil, for example. The internal and external current collectors 20, 21 are placed adjacent to the inner and outer sides respectively of the bottom wall 19 of cupped container 17, overlying the opening 18. The collectors 20, 21 are tightly adhered to the inner and outer sides of the bottom wall 19 by thin layers 22, 23 respectively, of an adhesive sealant which is chemically resistant to and non-wettable by the alkaline eletrolyte. Preferably, the layers 22, 23 of adhesive sealant cover substantially the entire surface of the collectors 20, 21 tightly sealing the interfaces between the collectors and the bottom wall 19. The collectors 20, 21 are electrically connected to one another through the opening 18 such as by means of a spot weld 24 or a solder spot. Alternatively, the collectors 20, 21 may be electrically connected to one another by means such as the use of an electrically conductive cement. The cupped container 17 and the pair of collectors 20, 21 are preferably assembled together in the manner as first described to form a composite member such as illustrated in the view of FIG. 2.

A rectangular cover 25 preferably made from the same liquid impervious, electrically non-conductive plastic film, is provided for the cupped container 17. The cover 25 is formed with a pair of spaced apart openings 26, 27, each of which is located at the approximate midpoint of each half-section of the cover 25.

A second and third terminal connection is provided in the cover 25. These two terminal connections are assembled in basically the same manner as in the assembly of the first terminal connection hereinabove described.

Figure 3:
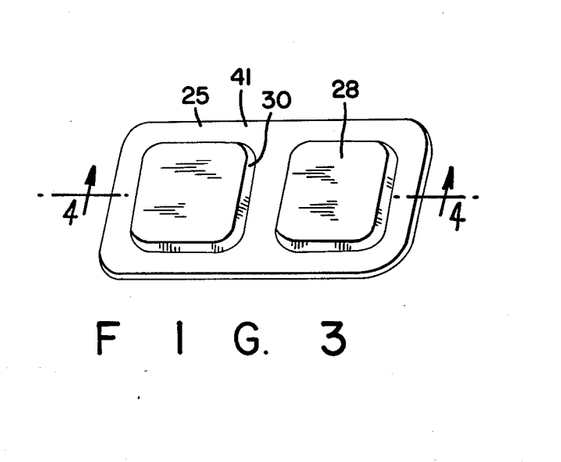
FIG. 3 is a perspective view of the underneath side of the composite cover-collector also used in the flat cell of FIG. 1.
Figure 4:
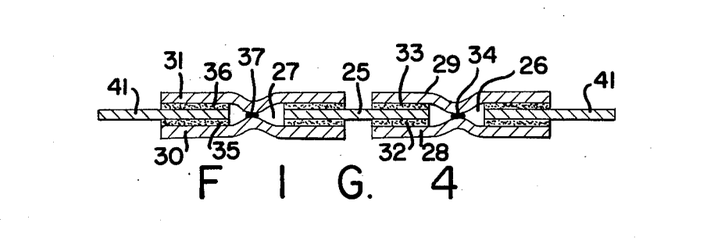
FIG. 4 is a cross-sectional view of the composite cover-collector taken along the line 4—4 in FIG. 3.

The second and third terminal connections comprise, respectively, second internal and external current collectors 28, 29 and third internal and external current collectors 30, 31, which also may suitably be thin metal plates or foil, e.g., nickel foil. The internal collectors 28, 30 for each of the two terminal connections are disposed adjacent to the inner side of the cover 25 and the external collectors 29, 31 are disposed adjacent to the outer side of the cover 25, overlying the openings 26, 27. The size of the collectors is smaller than each half-section of the cover 25 such that the pairs of internal and external collectors 28, 29 and 30, 31 are spaced apart from each other at the midpoint of the cover 25. The second internal and external collectors 28, 29 are tightly adhered to the inner and outer sides respectively of the cover 25 by a thin layer 32, 33 of the non-wetting adhesive sealant and are electrically connected to one another through the opening 26 by the spot weld 34. Similarly, the third internal and external collectors 30, 31 are tightly adhered to the inner and outer sides respectively of the cover 25 by a thin layer 35, 36 of the same adhesive sealant and are electrically connected to one another through the opening 27 by the spot weld 37. The layers of adhesive sealant cover substantially the entire face of the internal and external collectors 28-31, tightly sealing the interfaces between the collectors and the cover 25. The cover 25 and the collectors 28-31 are also preferably assembled to form a composite member such as illustrated in FIG. 3.

The pair of negative electrode plates 12, 13 are electrically interconnected by means of a thin metal collector tab 38 which is secured at one end to the corresponding peripheral edges of both negative electrode plates 12, 13 such as by welding. At its other end the tab 38 is interposed between and in contact with the negative electrode plate 13 and the internal collector 20 for the first terminal connection at one end of the electrode assembly. Similarly, the pair of positive electrode plates 10, 11 are electrically interconnected by means of a thin metal tab 39 which is secured at one end to the corresponding peripheral edges of both positive electrode plates 10, 11. At its other end the tab 39 is interposed between the separator 16 overlying the positive electrode plate 10 and the internal collector 28 for the second terminal connection at the other end of the electrode assembly. Tabs 38, 39 are secured such as by welding to the respective collectors 20, 28 during the assembly of the cell as will be described in greater detail hereinafter.

Both the cupped container 17 and the cover 25 which are preferably made from the same liquid impervious, electrically non-conductive plastic film, are formed with marginal borders 40, 41 respectively, which are secured together such as by heat sealing to provide a tight, leakage proof seam 42.

The method of assembling the flat cell construction may now be described in greater detail. As indicated, the cupped container 17 is first formed as a composite member with both the first internal and external current collectors 20, 21 tightly adhered to the inner and outer sides of the container bottom wall 19 through means of the thin layers 22, 23 of the adhesive sealant. Similarly, the cover 25 is first formed as a composite member with the first and second internal and external collectors 28–31 tightly secured to the inner and outer sides of the cover through means of the thin layers 32, 33 and 35, 36 of the adhesive sealant. Tab 38 is secured such as by welding to the corresponding peripheral edges of the pair of positive electrode plates 10, 11. A continuous strip 14 of the separator material, which is approximately three times the length of an electrode plate, is wound completely around the negative electrode plate 12 with one end being secured to the portion of the separator strip 14 which overlaps the peripheral edge of the negative electrode plate 12 suitably by a heat seal as shown at 43 in FIG. 1. Provision is made for passage of the tab 38 through the strip 14 such as by means of a slot as shown at 44. The free portion 14a of the strip 14 which extends beyond the seal 43 is interleaved between the pair of negative electrode plates 12, 13. Tab 38 is then secured as by welding to the first internal collector 20 within the bottom of the cupped container 17 while in a similar manner tab 39 is secured as by welding to the second internal collector 28 on the cover 25. The pair of positive electrode plates 10, 11 are then interleaved with the pair of negative electrode plates 12, 13 with the negative electrode plate 12, which is enveloped by the separator strip 14, interposed between the pair of positive electrode plates 10, 11 to complete the electrode assembly. The auxiliary electrode 15 is then secured such as by welding to the third internal collector 30. With all of the cell components placed in the manner as hereinabove described, the cover 25 is placed over the open end of the cupped container 17 and their marginal borders 40, 41 are secured together such as by heat sealing to complete the assembly of the cell.

It will be readily seen from the above description that the assembly of the first internal and external collectors 20, 21 constitutes the negative terminal connection and that the assembly of the second internal and external collectors 28, 29 constitutes the positive terminal connection of the flat cell. The assembly of the third internal and external collectors 30, 31 constitutes a third terminal connection which in the flat cell illustrated is the terminal connection for the auxiliary oxygen sensing electrode 15.

Figure 5:
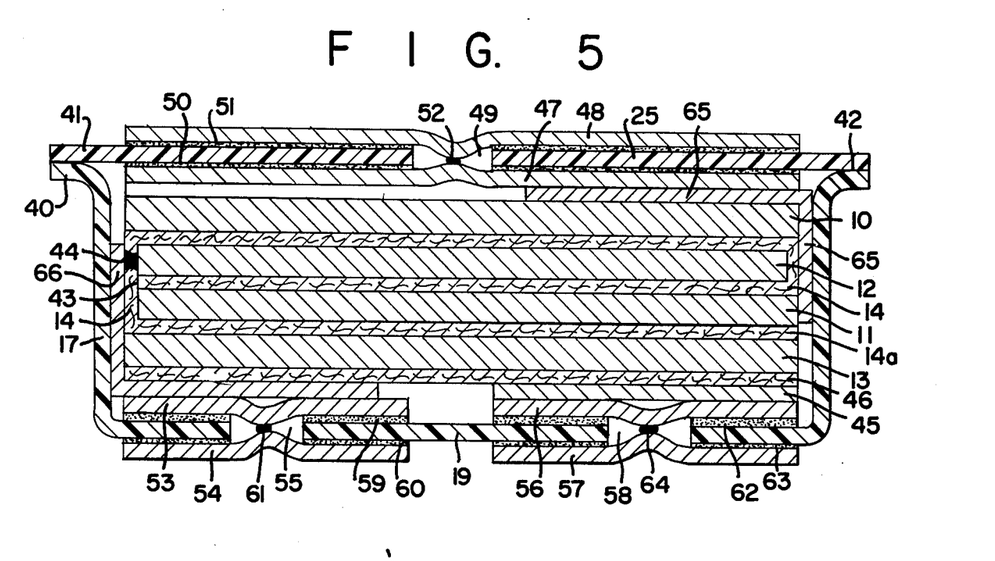
FIG. 5 is a view similar to FIG. 1 showing another embodiment of a flat cell construction made in accordance with the invention.
Figure 6:
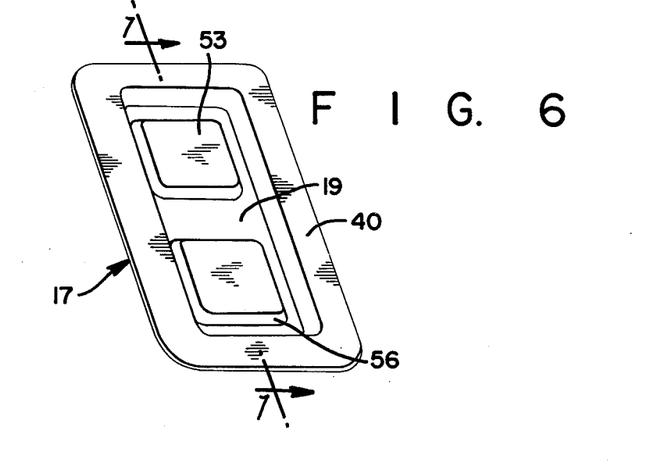
FIG. 6 is a perspective view of the composite cupped container-collector used in the flat cell of FIG. 5.
Figure 7:
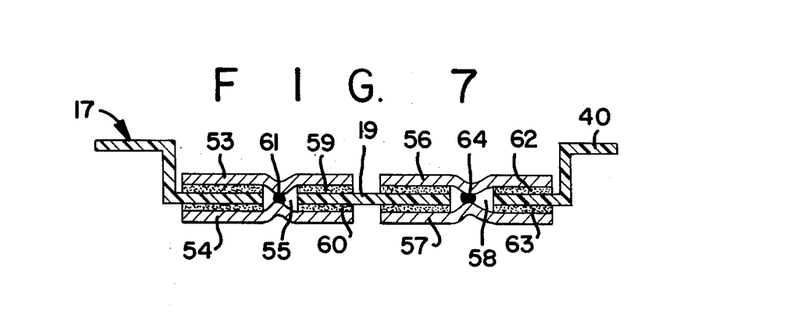
FIG. 7 is a cross-sectional view of the composite cupped container-collector taken along the lines 7—7 in FIG. 6.

FIGS. 5–7 illustrate another embodiment of a flat cell construction in accordance with the invention wherein like reference numerals denote the same or similar parts as used in the flat cell hereinabove described. In this flat cell construction, the third terminal connection is incorporated in the bottom wall 19 of the cupped container 17 instead of in the cover 25.

The electrode assembly used in this flat cell construction is basically the same arrangement of flat thin positive electrode plates 10, 11 and flat thin negative electrode plates 12, 13 arranged in alternate fashion with the positive electrode plate 10 being located at one end of the electrode assembly, the negative electrode plate 12 placed between the pair of positive electrode plates 10, 11 and with the negative electrode plate 13 being located at the opposite end of the electrode assembly. The same porous separator strip 14, thoroughly soaked with the alkaline electrolyte, is sandwiched between the pairs of positive and negative electrode plates 10–13.

An auxiliary electrode 45 is positioned adjacent to the negative electrode plate 13 at one end of the electrode assembly. Again the auxiliary electrode 45 is less than half the size of the positive and negative electrode plates 10–13 and is preferably placed over the bottom of one half-section of the negative electrode 13 (the right hand half-section of the negative electrode 13 in FIG. 5). A separate porous separator 46, e.g., Pellon, thoroughly soaked with the alkaline electrolyte, is interposed between and in contact with the negative electrode plate 13 and the auxiliary electrode 45.

The auxiliary electrode 45 in this instance may be a hydrogen sensing electrode. The auxiliary electrode 45 is preferably positioned adjacent to the negative electrode plate 13 in order to sense more effectively any hydrogen gas that may be evolved at this electrode particularly during deep discharge of the cell. The hydrogen sensing electrode 45 may be made from a porous sintered nickel plaque impregnated with a suitable hydrogen catalyst such as a platinum group metal, e.g., platinum, palladium and radium.

A first terminal connection is provided in the cover 25 and comprises both internal and external current collectors 47, 48 which may also be flat thin metal plates or foil, e.g., nickel foil. The internal and external collectors 47, 48 are placed ajacent to the inner and outer sides respectively of the cover 25, overlying an opening 49 located at the midpoint of the cover 25. The collectors 47, 48 are again tightly adhered to the inner and outer sides of the cover 25 by thin layers 50, 51 respectively of the non-wetting adhesive sealant. The layers 50, 51 of adhesive sealant preferably cover substantially the entire surface of each collector 47, 48 tightly sealing the interfaces between the collectors and the cover 25. Both of the collectors 47, 48 are electrically connected to one another through the opening 49 by means of the spot weld 52. Similar to the flat cell illustrated in FIGS. 1–4, the cover 25 and collectors 47, 48 are preferably assembled to form a composite member as hereinabove described.

A second and third terminal connection are provided in the bottom wall 19 of the cupped container 17. The two terminal connections are also assembled in basically the same manner as hereinabove described.

The second and third terminal connections comprise, respectively, second internal and external current collectors 53, 54, which overlie an opening 55 located at the approximate midpoint of one half-section of the bottom wall 19, and third internal and external current collectors 56, 57, which overlie an opening 58 located at the approximate midpoint of the other half-section of the bottom wall 19. The internal and external collectors 53, 54 and 56, 57 are also suitably thin metal plates or foil, e.g., nickel foil. The internal collectors 53, 56 for each of the two terminal connections are disposed adjacent to the inner side of the bottom wall 19 and the external collectors 54, 57 are disposed adjacent to the outer side of the bottom wall 19, overlying the openings 55, 58. Again the size of the collectors is smaller than each half-section of the bottom wall 19 such that the pairs of internal and external collectors 53, 54 and 56, 57 are spaced apart from each other at the midpoint of the bottom wall 19. The second internal and external collectors 53, 54 are tightly adhered to the inner and outer sides respectively of the bottom wall 19 by a thin layer 59, 60 of the non-wetting adhesive sealant and are electrically connected to one another through the opening 55 by the spot weld 61. In the same manner, the third internal and external collectors 56, 57 are tightly adhered to the inner and outer sides respectively of the bottom wall 19 by a thin layer 62, 63 of the same adhesive sealant and are also electrically connected to one another through the opening 58 by the spot weld 64. The layers of adhesive sealant cover substantially the entire surface of the internal and external collectors 53, 54 and 56, 57, tightly sealing the interfaces between the collectors and the bottom wall 19. The cupped container 17 and the collectors 53, 54 and 56, 57 are also preferably assembled to form a composite member such as illustrated in FIGS. 6 and 7.

The flat cell of this embodiment of the invention is assembled in basically the same manner as the assembly of the flat cell construction illustrated in FIGS. 1–4. The pair of positive electrode plates 10, 11 are electrically interconnected by means of a thin metal collector tab 65 which is secured at one end to the corresponding peripheral edges of both positive electrode plates 10, 11 such as by welding. At its other end the tab 65 is interposed between and in contact with the positive electrode plate 10 and the internal collector 47 for the first terminal connection at one end of the electrode assembly. Similarly, the pair of negative electrode plates 12, 13 are electrically interconnected by means of a thin metal tab 66 which is secured at one end to the corresponding peripheral edges of both negative electrode plates 12, 13. The tab 66 at its other end is interposed between the separator 46, overlying the negative electrode plate 13, and the internal collector 53 for the second terminal connection at the opposite end of the electrode assembly. Tabs 65, 66 are secured such as by welding to the respective collectors 47, 53 during the assembly of the cell.

Auxiliary electrode 45 is maintained in electrical connection with the internal collector 56 for the third terminal connection. Preferably, auxiliary electrode 45 is secured such as by welding to the collector 56 also during assembly of the cell as hereinabove described.

It will be readily seen from the above description of the flat cell of this embodiment that the assembly of the first internal and external collectors 47, 58 constitutes the positive terminal connection and that the assembly of the second internal and external collectors 53, 54 constitutes the negative terminal connection of the flat cell. The assembly of the third internal and external collectors 56, 57 constitutes a third terminal connection which in this embodiment of the flat cell is the terminal connection for the auxiliary hydrogen sensing electrode 45.

In cells utilizing the rechargeable nickel-cadmium electrode system, gas generation and the consequent build up of substantial gas pressure inside the cell can occur particularly if the cell is placed on overcharge for the long periods of time. On overcharge, oxygen gas may be initially liberated at the positive electrode at a faster rate than it can be recombined at the negative electrode leading frequently to a build up of high internal gas pressure. Hydrogen gas can be evolved, for example, when the cell is subjected to deep discharge. The evolution of hydrogen gas further increases the gas pressure inside the cell since it does not normally recombine within the cell as does the oxygen.

In flat cells of this invention, the plastic film envelope which is made, for example, of a polypropylene or vinyl film is flexible and fairly weak. The cell can rupture, although without danger, if the internal gas pressure is allowed to build up to any significant level such as 160 psi, for example. In order to avoid this problem, it has been found desirable to provide a mechanism for preventing the generation of hydrogen at the negative electrode while at the same time facilitating the recombination of oxygen. Accordingly, in the preferred embodiment of a rechargeable nickel-cadmium flat cell, the positive and negative electrodes are balanced electrochemically with respect to one another such that the capacity of the negative electrode is greater than that of the positive electrode. Preferably, the capacity of the negative electrode is at least one and one-half times greater than that of the positive electrode and may be as great as 3 times the positive capacity.

As a further deterrent against cell rupture due to the build up of excessive internal gas pressure, flat cells of the construction disclosed and claimed in our above referred to copending application may incorporate an auxiliary oxygen or hydrogen sensing electrode together with a third terminal connection in accordance with the invention. In the instance where the auxiliary electrode is an oxygen sensing electrode, the auxiliary electrode forms with the negative electrode a voltage differential whose value will depend on the partial oxygen pressure that is developed inside the cell. Conversely, in the case where the auxiliary electrode is a hydrogen sensing electrode, the auxiliary electrode forms with the positive electrode a voltage differential whose value will depend on the partial hydrogen pressure inside the cell. Under conditions where the cell evolves copious quantities of oxygen gas on overcharge, for instance, the partial oxygen pressure will rise inside the cell, the voltage differential will change and this change can be utilized as a signal for actuating a control device in the charge circuit to cut off the charging current and thereby prohibit the further build up of gas pressure inside the cell. Charging circuits utilizing such control devices are of course well known to those skilled in the art.

In assembling batteries of flat cells of the construction disclosed and claimed in our above referred to copending application, only one cell incorporates a third terminal connection and auxiliary oxygen or hydrogen sensing electrode and this cell is utilized as a so-called "control cell", it being understood that the remaining battery cells will be maintained in approximately the same state of charge or discharge. Such batteries may be assembled with the flat cells interconnected in series, parallel or series parallel arrangement.

In assembling a series-connected battery, for instance, the flat cells may be stacked one on top of another with the positive terminal connection in one wall of each cell making electrical contact with the negative terminal connection in the opposite wall of the next cell. The control cell may then be placed at either end of battery stack of cells in order to more readily facilitate the electrical connection of the control cell into the charging circuit. Other arrangements of the battery assembly and control cell are of course possible as will readily occur to those skilled in the art.

Flat cells utilizing a third terminal connection in accordance with the invention may also incorporate an auxiliary electrode which functions as a voltage reference device. Such applications are particularly useful to the researcher since the auxiliary electrode can be utilized to study the behavior of either the positive or negative electrode without the necessity of disassembling the cell structure. In the two embodiments of the flat cell illustrated in the drawing, the auxiliary electrode can be readily utilized as a voltage reference device. It is only necessary to make the proper external electrical connections between the positive or negative and the third terminal connections of the cell. The auxiliary voltage reference electrode in this instance may be composed of a sintered nickel plaque impregnated with a metal hydroxide as the active material.

It will of course be understood that the auxiliary electrode used in the two embodiments of the invention described herein may be either oxygen or hydrogen sensing electrodes. Thus in the embodiment of the flat cell illustrated in FIGS. 1–4, the auxiliary electrode 45 may be a hydrogen sensing electrode, although it is preferred to position this electrode adjacent to the negative electrode.

Commerical plastic films which may be utilized in forming the sealed envelope in flat cells of the invention include those made of the following materials: vinyl polymers and copolymers, polyvinylidene chloride, polyethylene, polypropylene, nylon, polysulfone, polystyrene, and fluorocarbon polymers. For use with the preferred fatty polyamide adhesive, films made of polyethylene, polypropylene, and vinyl polymers and copolymers are preferred. Regular and shrink-type films are available in these materials. Described film characteristics include the following: low cost, flexibility, tear and puncture resistance, chemical stability and resistance to alkaline battery electrolyte, hot-formability low oxygen gas and water vapor transmission rates, and of course strong surface adherence with fatty polyamide or equivalent adhesive. To reduce the gas and water vapor transmission rate of the plastic film, it may be vacuum metallized or otherwise given a surface metallic coating on one or both sides providing of course the film is not made electrically conductive enough to put a parasitic current drain on the cell.

Although there are probably a number of organic compounds which exhibit a non-wetting characteristic when in contact with an alkaline electrolyte, the most preferred adhesive sealant for use in the practice of the invention are the fatty polyamides. Such fatty polyamide sealants are disclosed in U.S. Pat. application Ser. No. 392,222 of J. Winger filed on Aug. 28, 1973, which is a continuation of U.S. Pat. application Ser. No. 167,678, filed on July 30, 1971, and assigned to the common assignee hereof. As disclosed in the copending application, fatty polyamides are produced by reacting a polybasic acid with a polyfunctional amine.

Generally, the fatty polyamides useful in the practice of the invention are those having an amine number of above about 9. The amine number is the number of milligrams of KOH equivalent to one gram of fatty polyamide and is determined by procedures well known in the art. The fatty polyamide sealants can be mixed with extenders and modifiers in order to modify the physical properties of the fatty polyamide. In constructing flat cells in accord with the invention, the fatty polyamide sealant can be applied as a hot-melt or from solution in a solvent such as an alcohol/aromatic hydrocarbon mixture. Among the specific commercially available fatty polyamides that are particularly useful in constructing flat cells of the invention are those produced under the tradenames of VERSALON and GENBOND, General Mills, Inc. and Swift's Z-610, Swift and Company.

It has been found that during the assembly of flat cells of the invention the preferred adhesive sealants, i.e., fatty polyamides, do not readily wet some types of plastic film and accordingly a liquid tight seal between the cupped container and cover and the metal collector foils is sometimes difficult to attain. This difficulty may be overcome and the bond between the plastic film and the collector foils substantially improved if the plastic film is first subjected to successive heat and corona discharge treatments. The process for treating the plastic film is disclosed and claimed in our copending application Ser. No. 456,877, filed on Apr. 1, 1974 now U.S Pat. No. 3,914,521. In this process, the plastic film is heated to an elevated temperature, about 120°C in the case of a polypropylene film, for a period of about one half minute, optionally cooling the plastic film to ambient temperature and then subjecting the film to a high intensity corona discharge in the area of the film where the collector foils are to be adhered.

Although the invention has been described herein with particular reference to rechargeable flat cell systems such as the nickel-cadmium cell wherein an auxiliary electrode is used as an oxygen or hydrogen sensing electrode, it will be understood that the invention is not so limited and is applicable as well to primary flat cells wherein the auxiliary electrode is utilized as a voltage reference electrode.

Primary flat alkaline cells which are believed to be readily adaptable to the flat cell construction herein described include the following: alkaline manganese dioxide-zinc, silver oxide-zinc, and mercuric oxide-zinc.

Electrodes and other materials employed would of course be those required by and compatible with the cell system employed. For example, the collector plates used with the alkaline manganese dioxide-zinc system would preferably be of copper or brass rather than steel. Similarly the flat electrodes employed could be of the well known pressed powder type on an open or expanded conductive substrate rather than of the impregnated porous sinter type.

It is obvious that the flat cell construction of the invention need not be limited to the rectangular format. Other shapes of cell such as square, circular, elliptical, hexagonal, and various irregular figures could be encased in plastic film and provided with a positive, negative and a third terminal connection by the technique herein disclosed.

Although not illustrated in the drawing, it is evident that certain variants in the flat cell construction are possible. For example, it would be within the scope of the invention to construct a thicker cell than that illustrated by encasing the cell in two opposed and sealed cupped assemblies rather than using the cup and cover assemblies illustrated. Similarly a thinner cell could be encased in two cover assemblies. It is also possible to construct the flat cell with the first, second and third terminal connections incorporated in one wall of the sealed envelope, e.g., the bottom wall of the cupped container or the cover. Suitable means such as collector tabs can be used to make electrical connection between the positive, negative and auxiliary electrodes and the terminal connections in one wall of the sealed envelope. Additionally, the external current collectors need not be flat metal plates or foil but can be suitably made of any other configuration such as a curved plate or the like.

What is claimed is:

1. An alkaline cell comprising, in combination: an electrode assembly including at least one pair of flat electrode elements of opposite polarity and a porous separator containing an alkaline electrolyte; an auxiliary electrode; a liquid impervious plastic film envelop having a plurality of walls enclosing both said electrode assembly and said auxiliary electrode and having at least three openings spaced apart from one another at predetermined locations in at least one wall thereof; and a plurality of terminal connections communicating individually through said openings with said pair of electrode elements and said auxiliary electrode, with each terminal connection comprising: an internal and an external current collector overlaying said plastic film on opposite sides of an opening thereof, a thin layer of adhesive sealant, which is non-wettable by said alkaline electrolyte, for securing said internal and external current collector to said plastic film, and means for making electrical connection between the internal and external current collector through such opening.

2. A flat alkaline cell comprising, in combination:
   a. an electrode assembly including at least a pair of flat electrode elements of opposite polarity and a porous separator containing an alkaline electrolyte interposed between and in contact with the pair of electrode elements;
   b. a sealed, liquid impervious plastic film envelope enclosing said electrode assembly, said plastic film envelope having first and second wall members, one of which is disposed adjacent to one end of said electrode assembly and the other of which is disposed adjacent to the other end thereof, said first wall member having at least one opening therein and said second wall member having at least two spaced apart openings therein;
   c. a first internal current collector disposed adjacent to the inner side of said first wall member;
   d. a first external current collector disposed adjacent to the outer side of said first wall member, both said first internal and external current collectors overlying said opening in said first wall member;
   e. a second internal current collector disposed adjacent the inner side of said second wall member;
   f. a second external current collector disposed adjacent to the outer side of said second wall member, both said second internal and external current collectors overlying one of said openings in said second wall member;
   g. a third internal current collector disposed adjacent to the inner side of said second wall member;

h. a third external current collector disposed adjacent to the outer side of said second wall member, both said third internal and external current collectors overlying the other opening in said second wall member;

i. said first internal and external current collectors being tightly adhered to the inner and outer sides respectively of said first wall member and said second and third internal and external current collectors being tightly adhered to the inner and outer sides respectively of said second wall member by thin layers of an adhesive sealant which is non-wettable by the alkaline electrolyte;

j. said first internal current collector being in electrical connection with one of said flat electrode elements and said second internal current collector being in electrical connection with another of said flat electrode elements of opposite polarity;

k. said third internal current collector member being in electrical connection with an auxiliary electrode; and l. means for making electrical connection between said first internal and external current collectors through said opening in said first wall member and between said second and third internal and external current collectors respectively through said openings in said second wall member.

3. The flat alkaline cell as defined by claim 2, wherein the thin layers of said adhesive sealant are applied to substantially one entire face of each of said first, second and third internal and external current collectors, tightly adhering said collectors to the inner and outer sides of said first and second wall members.

4. The flat alkaline cell as defined by claim 2, wherein said adhesive sealant comprises a fatty polyamide.

5. The flat alkaline cell as defined by claim 2, wherein said sealed envelope is made of a plastic film material selected from the group consisting of polyvinyl chloride, polyvinyl chloride copolymers, polypropylene and polyethylene.

6. The flat alkaline cell as defined by claim 2, wherein said electrode assembly includes at least one flat electrode element containing nickel hydroxide as the positive active material and at least one flat electrode element containing cadmium oxide or cadmium hydroxide as the negative active material.

7. The flat alkaline cell as defined by claim 2, wherein said electrode assembly includes at least one flat electrode element containing zinc as an active material and at least one flat electrode element containing an active material selected from the group consisting of manganese dioxide, silver oxide, mercuric oxide and nickel hydroxide.

8. The flat alkaline cell as defined by claim 2, wherein said electrode assembly includes at least a pair of said flat positive electrode elements and at least a pair of said flat negative electrode elements, one of said pair of negative electrode elements being interposed between said pair of positive electrode elements and one of said pair of positive electrode elements being interposed between said pair of negative electrode elements.

9. The flat alkaline cell as defined by claim 2, wherein said means for making electrical connection between said first, second and third internal and external current collectors is a spot weld.

10. The flat alkaline cell as defined by claim 2, wherein said first, second and third internal and external current collectors are thin metal plates or foil.

11. The flat alkaline cell as defined by claim 8, wherein said porous separator comprises an elongated strip of separator material enclosing one of said pair of flat negative electrode elements and having a free portion which is interposed between one of said pair of flat positive electrode elements and the other flat negative electrode element.

12. The flat alkaline cell as defined by claim 8, wherein a first elongated collector tab is affixed at one end to both of said pair of flat positive electrode elements and is positioned at its other end in electrical connection with one of said first or second internal current collectors.

13. The flat alkaline cell as defined by claim 8, wherein the capacity of said flat negative electrode elements is at least one and one-half times greater than the capacity of said flat positive electrode elements.

14. The flat alkaline cell as defined by claim 12, wherein a second elongated collector tab is affixed at one end to both of said pair of flat negative electrode elements and is positioned at its other end in electrical connection with the other of said first or second internal current collectors.

15. A flat alkaline cell comprising, in combination, a cupped container and a cover both of which are composed of a liquid-impervious, plastic film material, an electrode assembly disposed in said cupped container and including at least a pair of flat electrode elements of opposite polarity and a porous separator containing an alkaline electrolyte interposed between and in contact with the pair of electrode elements, said cupped container having an opening in the bottom wall thereof, a first internal current collector disposed adjacent to the inner side of said bottom wall and a first external current collector disposed adjacent to the outer side of said bottom wall, both said first internal and external current collectors overlying said opening in said bottom wall, said cover having a pair of spaced apart openings therein, a second internal current collector disposed adjacent to the inner side of said cover and a second external current collector disposed adjacent to the outer side of said cover, both said second internal and external current collectors overlying one of said pair of openings in said cover, a third internal current collector disposed adjacent to the inner side of said cover and a third external current collector disposed adjacent to the outer side of said cover, both said third internal and external current collectors overlying the other of said pair of openings in said cover, said first, second and third internal and external current collectors being tightly adhered to the inner and outer sides respectively of said bottom wall and said cover by means of a thin layer of an adhesive sealant which is non-wettable by the alkaline electrolyte, said first internal current collector being in electrical connection with one of said flat electrode elements, said second internal current collector being in electrical connection with another of said flat electrode elements of opposite polarity, and said third internal current collectors being in electrical connection with an auxiliary electrode positioned at one end of said electrode assembly, and means for making electrical connection between said first internal and external current collectors through said opening in said bottom wall and between said second and third internal and external current collectors through said pair of openings in said cover, said cupped container and cover being sealed together along the marginal border thereof to completely enclose said cell.

* * * * *

UNITED STATES PATENT OFFICE
CERTIFICATE OF CORRECTION

Patent No. 3,982,966        Dated  September 28, 1976

Inventor(s)  Theodore R. Beatty et al.

It is certified that error appears in the above-identified patent and that said Letters Patent are hereby corrected as shown below:

Column 12, line 45, "Described" should read -- Desired --.

Signed and Sealed this

Twenty-fifth Day of January 1977

[SEAL]

Attest:

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,982,966          Dated September 28, 1976

Inventor(s) Theodore H. Beatty et al.

It is certified that error appears in the above-identified patent and that said Letters Patent are hereby corrected as shown below:

Column 2, line 64, change the first occurrence pressure to "presence".

Column 2, line 65, cancel the word "which"

Column 6, line 6, change 31 to "13"

Column 12, line 32, change 45 to "15"

Column 12, line 45, change Described to "Desired"

Signed and Sealed this

First Day of November 1977

[SEAL]

Attest:

RUTH C. MASON
Attesting Officer

LUTRELLE F. PARKER
Acting Commissioner of Patents and Trademarks